United States Patent
Begin et al.

(10) Patent No.: US 9,382,877 B2
(45) Date of Patent: Jul. 5, 2016

(54) TURBOCHARGER THRUST BEARING DEBRIS TRAP

(71) Applicant: GM GLOBAL TECHNOLOGY OPERATIONS LLC, Detroit, MI (US)

(72) Inventors: Louis P. Begin, Rochester, MI (US); Ran Wu, Auburn Hills, MI (US); Dingfeng Deng, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/520,794

(22) Filed: Oct. 22, 2014

(65) Prior Publication Data

US 2016/0115909 A1    Apr. 28, 2016

(51) Int. Cl.

| F02B 33/44 | (2006.01) |
|---|---|
| F16C 32/06 | (2006.01) |
| F02M 25/07 | (2006.01) |
| F04D 29/051 | (2006.01) |

(52) U.S. Cl.
CPC ......... *F02M 25/0706* (2013.01); *F04D 29/051* (2013.01); *F16C 32/0651* (2013.01)

(58) Field of Classification Search
CPC ...... F02B 39/14; F02B 39/005; F04D 29/051; F01D 25/16; F01D 25/168; F01D 25/18; F16C 32/0651
USPC .................. 60/605.3, 599; 123/563; 417/407; 384/123
See application file for complete search history.

(56) References Cited

U.S. PATENT DOCUMENTS

| 4,420,160 | A | * | 12/1983 | Laham | F04D 29/12 277/306 |
|---|---|---|---|---|---|
| 4,427,309 | A | * | 1/1984 | Blake | F01D 25/166 417/407 |
| 6,024,495 | A | * | 2/2000 | Loos | F01D 25/168 384/123 |
| 6,499,884 | B1 | * | 12/2002 | Svihla | F01D 25/186 384/901 |
| 2006/0018578 | A1 | * | 1/2006 | Krauss | F01D 25/168 384/420 |
| 2006/0165325 | A1 | * | 7/2006 | Link | F01D 25/168 384/123 |
| 2013/0205775 | A1 | * | 8/2013 | Begin | F01D 25/166 60/605.3 |
| 2013/0255252 | A1 | * | 10/2013 | Fonville | F01D 25/168 60/605.3 |
| 2015/0285301 | A1 | * | 10/2015 | Begin | F04D 29/056 123/568.11 |

* cited by examiner

*Primary Examiner* — Kenneth Bomberg
*Assistant Examiner* — Ngoc T Nguyen
(74) *Attorney, Agent, or Firm* — Quinn Law Group, PLLC

(57) ABSTRACT

A turbocharger for an internal combustion engine includes a bearing housing and a rotating assembly arranged therein. The rotating assembly includes a shaft with a turbine wheel and a compressor wheel. The turbocharger also includes a thrust bearing assembly operatively connected to the shaft, lubricated by pressurized oil from the engine, and configured to transmit thrust forces developed by the turbine wheel to the bearing housing. The thrust bearing assembly includes a thrust plate having a first thrust face and a thrust washer having a second thrust face. An oil film is generated between the first and second thrust faces, and the first and second thrust faces rotate relative to each other and transmit the thrust forces to the bearing housing. The thrust plate and/or the thrust washer include a circumferential groove configured to trap oil-borne debris and minimize an amount of the debris in the oil film.

20 Claims, 4 Drawing Sheets

TURBOCHARGER THRUST BEARING DEBRIS TRAP

TECHNICAL FIELD

The present disclosure relates to a turbocharger thrust bearing assembly with a debris trap.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A typical turbocharger employs a central shaft that is supported by one or more bearings and transmits rotational motion between an exhaust-driven turbine wheel and an air compressor wheel. Both the turbine and compressor wheels are fixed to the shaft, which in combination with various bearing components constitute the turbocharger's rotating assembly. Because the rotating assembly frequently operates at speeds over 100,000 revolutions per minute (RPM), effective lubrication of the bearing components is essential for long term durability of the turbocharger.

SUMMARY

One embodiment of the disclosure is directed to a turbocharger for an internal combustion engine. The turbocharger includes a bearing housing and a rotating assembly arranged within the bearing housing. The rotating assembly includes a shaft with a turbine wheel and a compressor wheel mounted thereon. The turbine wheel is configured to be driven by post-combustion gasses from the engine and the compressor wheel is configured to pressurize an ambient airflow for delivery to the engine. The turbocharger also includes a thrust bearing assembly operatively connected to the shaft, lubricated by a pressurized oil from the engine, and configured to transmit thrust forces developed by the turbine wheel to the bearing housing. The thrust bearing assembly includes a thrust plate that is fixed to the bearing housing and has a first thrust face, and a thrust washer that is fixed to the shaft and has a second thrust face. The second thrust face is configured to rotate relative to the first thrust face and transmit the thrust forces to the bearing housing. The pressurized oil generates an oil film between the first and second thrust faces. At least one of the thrust plate and the thrust washer includes a circumferential groove configured to trap debris borne by the pressurized oil and minimize an amount of the debris present in the oil film.

The thrust plate may be defined by an outer first diameter and the thrust washer may be defined by an outer second diameter. In such an embodiment the outer first diameter is greater than the outer second diameter. The first thrust face may include at least one thrust pad and the second thrust face may include at least one thrust surface. In such an embodiment the thrust pad and the thrust surface may each be defined by an equivalent inner third diameter and by an equivalent outer fourth diameter that is smaller than the outer second diameter. Additionally, the circumferential groove may be arranged on a fifth diameter that is smaller than the outer second diameter.

The fifth diameter may be greater than each of the inner third diameter and the outer fourth diameter.

In a particular construction, the thrust plate may include the circumferential groove, while the thrust pad may include a plurality of individual thrust pads separated by respective and discrete radial slots. The radial slots of the subject embodiment may additionally be in fluid communication with the circumferential groove.

The pressurized oil may enter the thrust bearing assembly via a feed-hole defined by the thrust plate and arranged at one of the radial slots.

One of the plurality of individual thrust pads may have a radially shorter length defined by the outer fourth diameter and an inner sixth diameter that is greater than the inner third diameter. Such a radially shorter length of one thrust pad is intended to direct the debris to the circumferential groove via the radial slots and away from the rest of the plurality of individual thrust pads.

In an alternative construction, the thrust washer may include the circumferential groove.

The thrust washer may rotate with the shaft about an axis and the circumferential groove may be centered on the axis.

The circumferential groove may be defined by a width and a depth. The width may be in the range of 0.25-0.75 mm and the depth may be in the range of 0.25-0.75 mm.

The thrust plate may be configured from one of brass and bronze and the thrust washer may be configured from steel.

The turbocharger may additionally include a journal bearing configured to support the shaft. In such a case, the thrust bearing assembly may be positioned on the shaft along the axis between the journal bearing and the compressor wheel.

Another embodiment of the present disclosure is directed to an internal combustion engine having the turbocharger described above. The subject engine includes an engine block defining a combustion chamber that receives an air-fuel mixture for combustion therein and configured to exhaust post-combustion gasses therefrom, and an oil pump configured to supply the pressurized oil.

The engine may additionally include a turbocharger oil line. The engine block may additionally define an engine oil passage in fluid communication with the oil pump. In such a case, the turbocharger oil line is in fluid communication with the engine oil passage to thereby supply the pressurized oil from the oil pump to the thrust bearing assembly. In such an engine, the turbocharger oil line may be characterized by an absence of an in-line oil filter that may otherwise be required to trap the debris borne by the pressurized oil.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
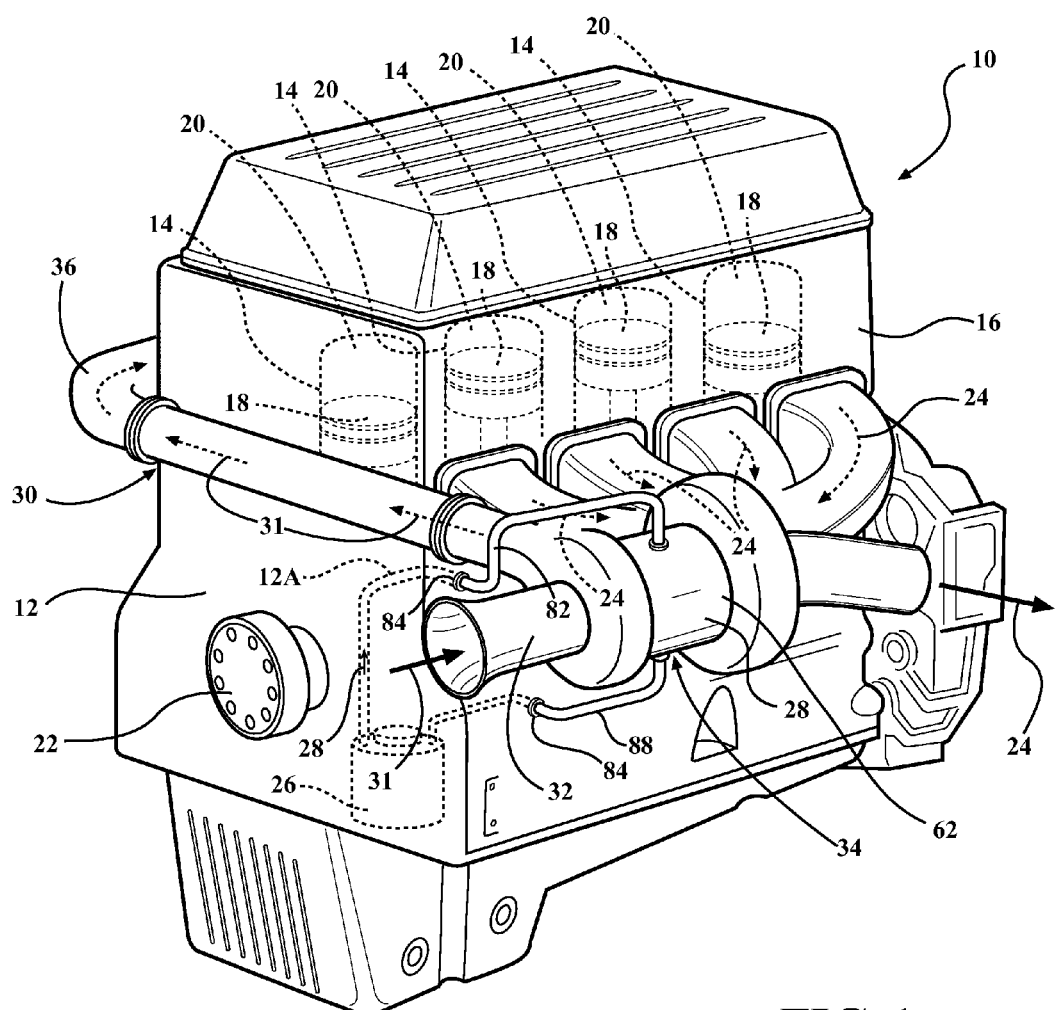
FIG. 1 is a schematic perspective view of an engine with a turbocharger according to the disclosure.

Referring to the drawings wherein like reference numbers correspond to like or similar components throughout the several figures, FIG. 1 illustrates an internal combustion engine 10. The engine 10 also includes an engine or cylinder block 12 with a plurality of cylinders 14 arranged therein. As shown, the engine 10 also includes a cylinder head 16. Each cylinder 14 includes a piston 18 configured to reciprocate therein. Combustion chambers 20 are formed within the cylinders 14 between the bottom surface of the cylinder head 16 and the tops of the pistons 18. As known by those skilled in the art, combustion chambers 20 are configured to receive a fuel-air mixture for subsequent combustion therein.

The engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to exhaust post-combustion gases 24 from the respective cylinder 14. The engine 10 also includes an oil pump 26 configured to supply pressurized engine oil 28 throughout the engine 10. The cylinder block 12 defines an engine oil passage 12A in fluid communication with the oil pump 26, thereby directing pressurized engine oil 28 from the oil pump 26 to various bearings, such as that of the crankshaft 22. The oil pump 26 may be driven directly by the engine 10, or by an electric motor (not shown).

The engine 10 additionally includes an induction system 30 configured to channel airflow 31 from the ambient to the cylinders 14. The induction system 30 includes an intake air duct 32, a turbocharger 34, and an intake manifold 36. Although not shown, the induction system 30 may additionally include an air filter upstream of the turbocharger 34 for removing foreign particles and other airborne debris from the airflow 31. The intake air duct 32 is configured to channel the airflow 31 from the ambient to the turbocharger 34, while the turbocharger is configured to pressurize the received airflow, and discharge the pressurized airflow to the intake manifold 36. The intake manifold 36 in turn distributes the previously pressurized airflow 31 to the cylinders 14 for mixing with an appropriate amount of fuel and subsequent combustion of the resultant fuel-air mixture.

Figure 2:
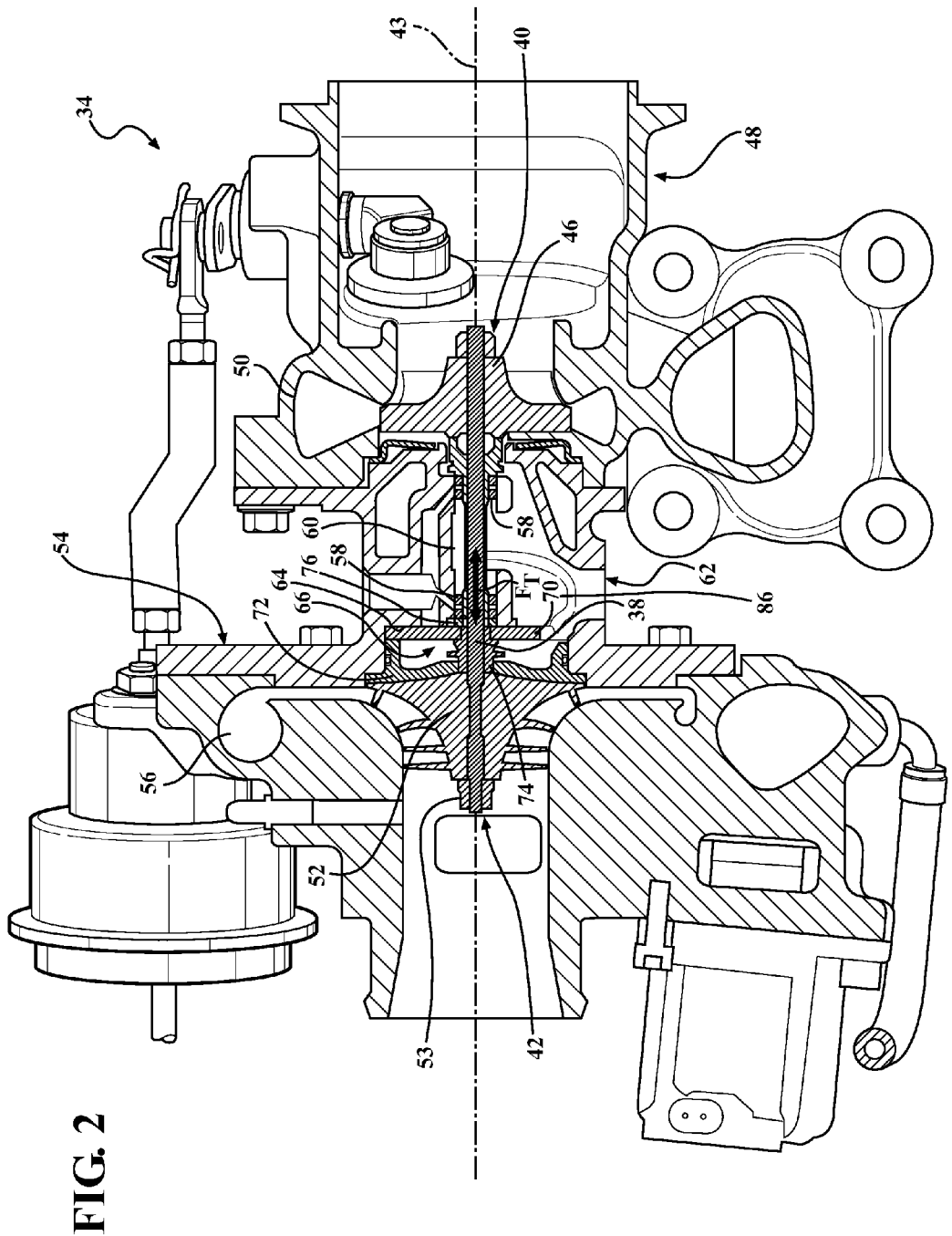
FIG. 2 is a schematic cross-sectional view of the turbocharger shown in FIG. 1, wherein the turbocharger includes a bearing housing supporting the turbocharger's rotating shaft.

As shown in FIG. 2, the turbocharger 34 includes a steel shaft 38 having a first end 40 and a second end 42. A turbine wheel 46 is mounted on the shaft 38 proximate to the first end 40 and configured to be rotated along with the shaft 38 about an axis 43 by post-combustion gasses 24 emitted from the cylinders 14. The turbine wheel 46 is typically formed from a temperature and oxidation resistant material, such as a nickel-chromium-based "inconel" super-alloy to reliably withstand temperatures of the post-combustion gasses 24, which in some engines may approach 2,000 degrees Fahrenheit. The turbine wheel 46 is disposed inside a turbine housing 48 that includes a volute or scroll 50. The scroll 50 receives the post-combustion exhaust gases 24 and directs the exhaust gases to the turbine wheel 46. The scroll 50 is configured to achieve specific performance characteristics, such as efficiency and response, of the turbocharger 34.

As further shown in FIG. 2, the turbocharger 34 also includes a compressor wheel 52 mounted on the shaft 38 between the first and second ends 40, 42. The compressor wheel 52 is retained on the shaft 38 via a specially configured fastener 53. The compressor wheel 52 is configured to pressurize the airflow 31 being received from the ambient for eventual delivery to the cylinders 14. The compressor wheel 52 is disposed inside a compressor cover 54 that includes a volute or scroll 56. The scroll 56 receives the airflow 31 and directs the airflow to the compressor wheel 52. The scroll 56 is configured to achieve specific performance characteristics, such as peak airflow and efficiency of the turbocharger 34. Accordingly, rotation is imparted to the shaft 38 by the post-combustion exhaust gases 24 energizing the turbine wheel 46, and is in turn communicated to the compressor wheel 52 owing to the compressor wheel being fixed on the shaft. As understood by those skilled in the art, the variable flow and force of the post-combustion exhaust gases 24 influences the amount of boost pressure that may be generated by the compressor wheel 52 throughout the operating range of the engine 10. The compressor wheel 52 is typically formed from a high-strength aluminum alloy that provides the compressor wheel with reduced rotating inertia and quicker spin-up response.

With continued reference to FIG. 2, the shaft 38 is supported for rotation about the axis 43 via a journal bearing 58. The journal bearing 58 is mounted in a bore 60 of a bearing housing 62 and is lubricated and cooled by the supply of pressurized engine oil 28 supplied via the pump 26. The bearing housing 62 includes a thrust wall 64. The bearing housing 62 may be cast from a robust material such as iron in order to provide dimensional stability to the bore 60 under elevated temperatures and loads during operation of the turbocharger 34. The journal bearing 58 is configured to control radial motion and vibrations of the shaft 38. As shown, the journal bearing 58 may be a fully-floating or a semi-floating type that is formed from a relatively soft metal, for example brass or bronze, such that any debris that passes through the bearing system would become embedded in the soft bearing material and not damage the shaft 38 or the bore 60. The journal bearing 58 may also be configured as a roller or ball bearing to further reduce turbocharger frictional losses during rotation of the shaft 38.

As shown in FIG. 2, the turbocharger 34 also includes a thrust bearing assembly 66 that is operatively connected to the shaft 38. The thrust bearing assembly 66 is configured, i.e., designed and constructed, to transmit thrust forces FT that develop during operation of the turbocharger 34 to the bearing housing 62. The thrust bearing assembly 66 includes a thrust plate 70 that is fixed to the bearing housing 62 by being held in place with a thrust retainer 72 against the thrust wall 64. The thrust bearing assembly 66 also includes a thrust collar 74 and a thrust washer 76. The bearing surface of the thrust plate 70 is typically formed from a relatively soft metal, for example brass or bronze, such that any debris that passes through the bearing system would become embedded in the soft bearing material and not damage the thrust collar 74 or the thrust washer 76. The thrust washer 76 is fixed to the shaft 38, typically by being pressed thereon, and thereby configured to rotate with the shaft about the axis 43. The thrust washer 76 is typically configured from a rigid material exhibiting high relative hardness, such as steel. The thrust retainer 72 may be held in place by a clip, one or more bolts, or otherwise attached to the bearing housing 62 in order to hold the thrust bearing assembly 66 securely against the thrust wall 64.

The thrust bearing assembly 66 counteracts a net thrust force FT developed within the turbocharger 34, when such a force is acting towards the compressor wheel 52. As shown, the thrust bearing assembly 66 is positioned on the shaft 38, between the journal bearing 58 and the compressor wheel 52 along the axis 43. The thrust bearing assembly 66 is lubricated and cooled by the supply of pressurized engine oil 28 supplied via the pump 26. During operation of the turbocharger 34, i.e., when the turbine wheel 46 is energized by the post-combustion gases 24, the thrust washer 76 transmits the thrust force FT developed by the turbine wheel 46 to the bearing housing 62 via the thrust plate 70.

Figure 3:
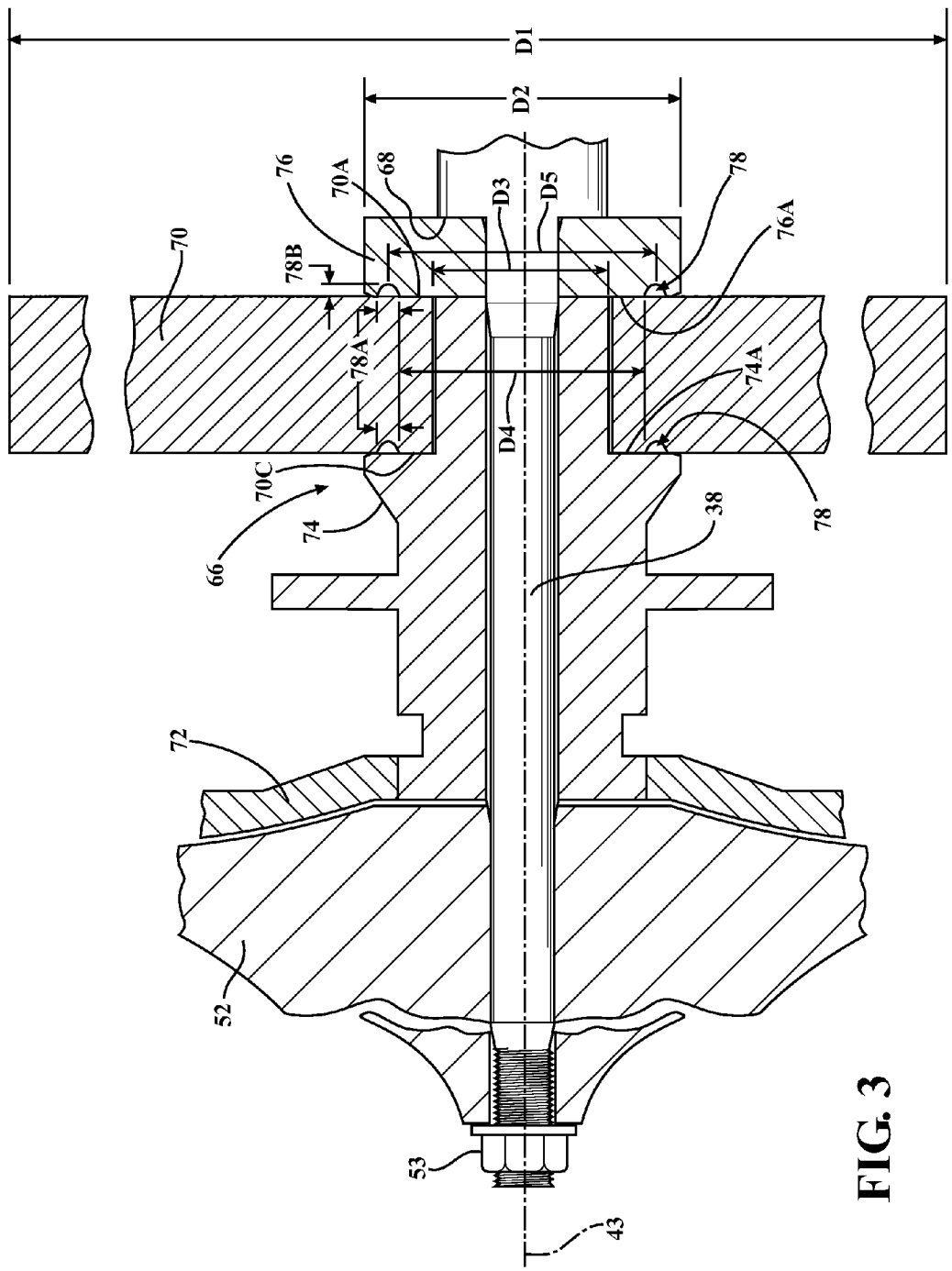
FIG. 3 is a schematic close-up partial cross-sectional view of the bearing housing shown in FIG. 2, specifically showing a thrust bearing assembly having a thrust plate and a thrust washer.

As shown in FIG. 3, the shaft 38 includes a shoulder 68. During assembly of the turbocharger 34, as the fastener 53 is tightened onto the shaft 38, the compressor wheel 52 is urged against the thrust bearing assembly 66 and the thrust bearing assembly is urged against the shoulder 68. Accordingly, the tightening of the fastener 53 removes clearance within the thrust bearing assembly 66 and preloads the thrust bearing assembly between the compressor wheel 52 and the shoulder 68. Also during assembly of the thrust bearing assembly 66 onto the shaft 38, the thrust collar 74 is configured to urge the thrust washer 76 against the shoulder 68 as the fastener 53 is tightened.

During operation of the turbocharger 34, the pressurized engine oil 28 from the pump 26 is delivered to the bearing housing 62 and directed to lubricate the thrust bearing assembly 66 and generate an oil film between the thrust washer 76 and the thrust plate 70. Such an oil film serves to reduce the likelihood of direct physical contact between the thrust washer 76 and the thrust plate 70 in order to extend useful life of the thrust bearing assembly 66 and durability of the turbocharger 34. The thrust plate 70 includes a first thrust face 70A, while the thrust washer 76 includes a second thrust face 76A. The aforementioned oil film is generated by the pressurized engine oil 28 between the first and second thrust faces 70A, 76A, such that, when the second thrust face 76A rotates relative to the first thrust face 70A, the thrust force FT is transmitted to the bearing housing 62 without direct contact between the thrust plate 70 and the thrust washer 76.

The thrust bearing assembly 66 additionally employs a circumferential groove 78 that is configured to trap debris borne by the pressurized engine oil 28. According to the disclosure, the circumferential groove 78 is arranged on at least one of the first thrust face 70A (shown in FIG. 4) and the second thrust face 76A (shown in FIGS. 3 and 5). As a result of the oil-borne debris being trapped within the circumferential groove 78, an amount of the debris present in the oil film between the thrust plate 70 and the thrust washer 76 is minimized. As shown in FIG. 3, the thrust plate 70 additionally includes a first contact face 70C, while the thrust collar 74 also includes a second contact face 74A. Each of the first and second contact faces 70C, 74A may be required to withstand the thrust force FT during some phases of operation of the turbocharger 34. To withstand such thrust force FT, an oil film is also developed between the respective first and second contact faces 70C and 74A. An additional circumferential groove 78 may be arranged on at least one of the first contact face 70C (shown in FIG. 3) and the second contact face 74A. Similar to the circumferential groove 78 on at least one of the first and second thrust faces 70A, 76A, the circumferential groove on the first contact face 70C and/or second contact face 74A is configured to trap debris borne by the pressurized engine oil 28.

Figure 4:
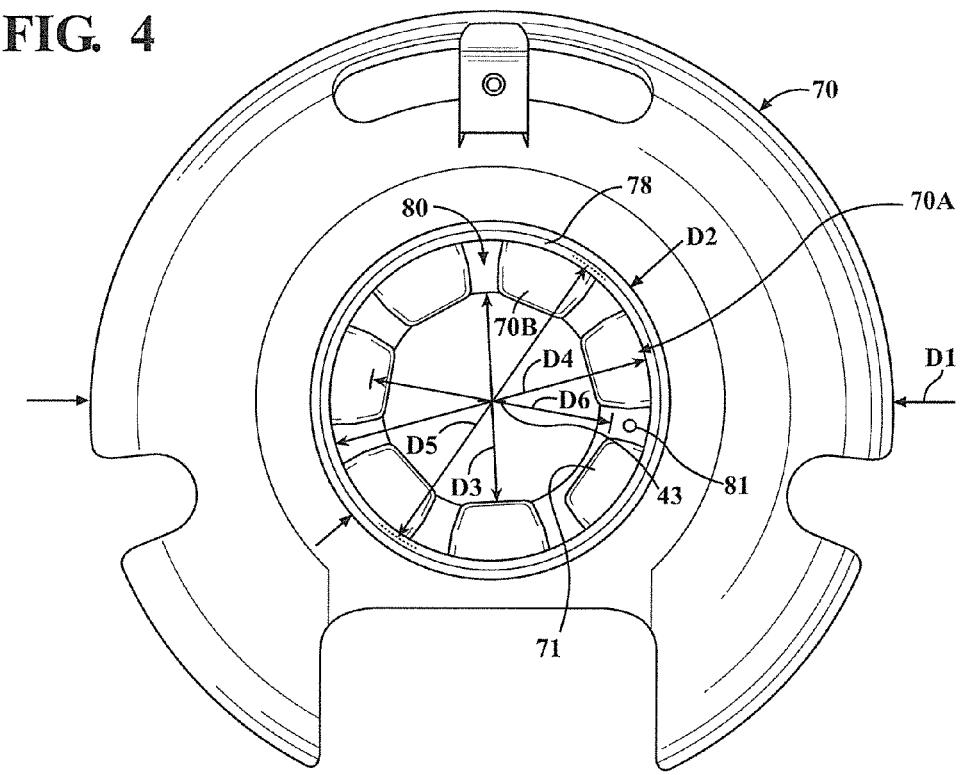
FIG. 4 is a schematic close-up front view of the thrust plate shown in FIG. 3, according to one aspect of the present disclosure.
Figure 5:
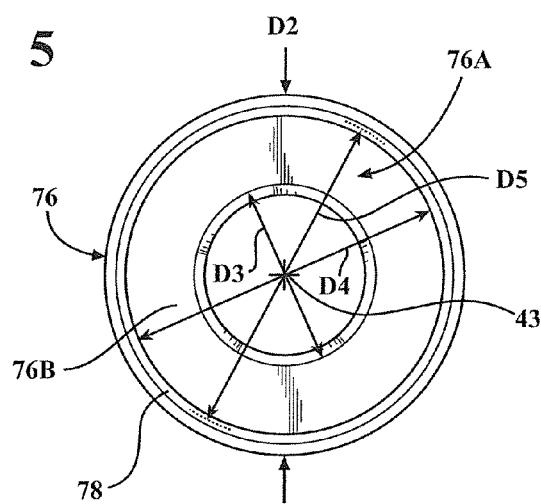
FIG. 5 is a schematic close-up front view of the thrust washer shown in FIG. 3, according to another aspect of the present disclosure.

The thrust plate 70 is defined by an outer first diameter D1 and the thrust washer 76 is defined by an outer second diameter D2, such that the outer first diameter is greater than the outer second diameter. The first thrust face 70A includes at least one thrust pad 70B, and, as shown in FIG. 4, may include a plurality of such thrust pads. As understood by those skilled in the art, each of such thrust pads may additionally include a ramped surface and a flat surface (not shown) for effective generation of the oil film between the first and second thrust faces 70A, 76A. As shown in FIG. 5, the second thrust face 76A includes at least one thrust surface 76B. Each thrust pad 70B and the thrust surface 76B may be defined by a generally same, i.e., equivalent within a specified manufacturing tolerance, inner third diameter D3. Each thrust pad 70B and the thrust surface 76B are also defined by a generally same outer fourth diameter D4 that is smaller than the outer second diameter D2. The circumferential groove 78 is arranged on a fifth diameter D5 that is greater than each of the inner third diameter D3 and the outer fourth diameter D4, but smaller than the outer second diameter D2. As a result, the circumferential groove 78 is positioned radially outside of the thrust pad 70B and the thrust surface 76B. Accordingly, the circumferential groove 78 is arranged such that, as the thrust washer 76 rotates with the shaft 38 relative to the thrust plate 70, the debris borne by the pressurized oil 26 that has collected in the groove is removed therefrom and away from the thrust pad 70B and the thrust surface 76B by centrifugal force.

In an embodiment shown in FIG. 4 where the first thrust face 70A includes the circumferential groove 78, the first thrust face 70A includes a plurality of individual thrust pads 70B. Each individual thrust pad 70B is separated from a neighboring thrust pad by a respective discrete radial slot 80. As shown in FIG. 4, each of the radial slots 80 is in fluid communication with the circumferential groove 78. The thrust plate 70 may additionally define a feed-hole 81 at one of the radial slots 80. In such an embodiment, the pressurized oil 28 will enter the thrust bearing assembly 66 via the feed-hole 81 proximately to one of the individual thrust pads 70B. Additionally, one of the individual thrust pads 70B may be modified with distinct geometry 71 relative to the other thrust pads to direct any debris to the circumferential groove 78 via the neighboring radial slots 80 and away from the other thrust pads. The subject thrust pad with the distinct geometry 71 may be positioned neighboring the particular slot 80 that includes the feed-hole 81. As compared with the remaining thrust pads 70B, such a distinct geometry 71 for one of the individual thrust pads may include a narrower width (not shown), a radially shorter length (shown in FIG. 4), and/or a triangular, i.e., wedge, shape (not shown). As shown, the radially shorter length of the subject thrust pad 70B with the modified geometry 70C is defined by the outer fourth diameter D4 and an inner sixth diameter D6 that is greater than the inner third diameter D3.

On the other hand, in an embodiment shown in FIG. 5, where the second thrust face 76A includes the circumferential groove 78 and the thrust washer 76 rotates with the shaft 38 about an axis 43 and the circumferential groove is centered on the axis. In each of the above-described embodiments, the circumferential groove 78 is defined by a width 78A and a depth 78B. The width may be in the range of 0.25-0.75 mm, while the depth may be in the range of 0.25-0.75 mm. The specific width 78A and depth 78B of the circumferential groove 78 may be defined in proportion to the volume of oil flow necessary to lubricate a particular thrust bearing assembly 66. The slots 80 have a depth that may be equivalent to the depth 78B of the circumferential groove 78. Although the above description focuses on the interface between the first and second thrust faces 70A, 76A, a similar geometry is applicable to the interface between the first and second contact faces 70C and 74A, with similar benefits being generated therein as a result.

Although the engine 10 typically includes a standard oil filter (not shown) configured to capture various oil-borne debris, such a standard filter is typically insufficient for removing the type and size of debris that may damage the thrust assembly 66. As may be seen from FIG. 1, the engine 10 additionally includes a turbocharger oil line 82. The turbocharger oil line 82 provides fluid communication between the engine oil passage 12A and the bearing housing 62. Accordingly, the turbocharger oil line 82 supplies the pressurized oil 28 from the oil pump 26 to the thrust bearing assembly 66. As a result of the circumferential groove 78 establishing the above-described trap for the debris borne by the pressurized oil 28, the turbocharger oil line 82 may be characterized by an absence of a dedicated in-line oil filter. Such a dedicated in-line oil filter is otherwise required for removing the debris borne by the pressurized oil 26, before such debris enters the thrust assembly 66 and causes damage thereto. As shown, the turbocharger oil line 82 may be an external tube attached to the engine block 12 via appropriate plumbing connections and/or fittings 84. In the alternative, the turbocharger oil line 82 may be a specific oil passage incorporated, such as cast, in the engine block 12, and connected to the bearing housing 62 at a mounting flange (not shown) of the turbocharger 34, as understood by those skilled in the art.

With resumed reference to FIG. 2, the bearing housing 62 also includes a drain volume 86 for the engine oil after the oil has passed through the thrust assembly 66. The drain volume 86 is an inner reservoir incorporated into the bearing housing 62 that receives the oil after the oil had passed through the journal bearing 58 and the thrust bearing assembly 66. As shown in FIG. 1, a discharge passage 88 removes oil from the bearing housing 62 following the lubrication of the thrust bearing assembly 66 and the oil's collection within the drain volume 86. As additionally shown in FIG. 1, the discharge passage 88 is in fluid communication with the pump 26 in order to return the oil to the pump from the drain volume 86. Accordingly, the oil is continuously circulated through the engine 10 and the turbocharger 34 by the oil pump 26 without the need for an additional dedicated in-line oil filter to ensure reliable operation of the thrust assembly 66.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A turbocharger for an internal combustion engine, the turbocharger comprising:
a bearing housing;
a rotating assembly arranged within the bearing housing and having a shaft with a turbine wheel configured to be driven by post-combustion gasses from the engine and with a compressor wheel configured to pressurize an ambient airflow for delivery to the engine; and
a thrust bearing assembly operatively connected to the shaft, lubricated by a pressurized oil from the engine, and configured to transmit thrust forces developed by the turbine wheel to the bearing housing;
wherein:
the thrust bearing assembly includes a thrust plate fixed to the bearing housing and having a first thrust face, and a thrust washer fixed to the shaft and having a second thrust face;
the pressurized oil generates an oil film between the first and second thrust faces;
the first thrust face is configured to rotate relative to the second thrust face and transmit the thrust forces to the bearing housing; and
at least one of the thrust plate and the thrust washer includes a circumferential groove configured to trap debris borne by the pressurized oil and minimize an amount of the debris present in the oil film.

2. The turbocharger of claim 1, wherein the thrust plate is defined by an outer first diameter and the thrust washer is defined by an outer second diameter, wherein the outer first diameter is greater than the outer second diameter, wherein the first thrust face includes at least one thrust pad and the second thrust face includes at least one thrust surface, wherein the thrust pad and the thrust surface are each defined by an inner third diameter and by an outer fourth diameter that is smaller than the outer second diameter, and wherein the circumferential groove is arranged on a fifth diameter that is smaller than the outer second diameter.

3. The turbocharger of claim 2, wherein the fifth diameter is greater than each of the inner third diameter and the outer fourth diameter.

4. The turbocharger of claim 2, wherein the thrust plate includes the circumferential groove.

5. The turbocharger of claim 4, wherein the thrust pad includes a plurality of individual thrust pads separated by respective radial slots, and the radial slots are in fluid communication with the circumferential groove.

6. The turbocharger of claim 5, wherein the thrust plate defines a feed-hole at one of the radial slots, and wherein the pressurized oil enters the thrust bearing assembly via the feed-hole.

7. The turbocharger of claim 5, wherein each of the plurality of individual thrust pads has a length, and wherein the length of one of the plurality of individual thrust pads is shorter than the length of each of the rest of the plurality of individual thrust pads, such that the debris is directed to the circumferential groove via the radial slots an away from the rest of the plurality of individual thrust pads.

8. The turbocharger of claim 2, wherein the thrust washer includes the circumferential groove.

9. The turbocharger of claim 7, wherein the thrust washer is configured to rotate with the shaft about an axis and the circumferential groove is centered on the axis.

10. The turbocharger of claim 1, wherein the thrust plate is configured from one of brass and bronze and the thrust washer is configured from steel.

11. An internal combustion engine comprising:
an engine block defining a combustion chamber configured to receive an air-fuel mixture for combustion therein and configured to exhaust post-combustion gasses therefrom;
an oil pump configured to supply pressurized oil; and a turbocharger configured to receive an airflow from the ambient and the post-combustion gasses from the combustion chamber, the turbocharger including:

a bearing housing;

a rotating assembly arranged within the bearing housing and having a shaft with a turbine wheel configured to be driven by the post-combustion gasses and a compressor wheel configured to pressurize the airflow for delivery to the combustion chamber; and a thrust bearing assembly operatively connected to the shaft, lubricated by the pressurized oil, and configured to transmit thrust forces developed by the turbine wheel to the bearing housing;

wherein:

the thrust bearing assembly includes a thrust plate fixed to the bearing housing and having a first thrust face, and a thrust washer fixed to the shaft and having a second thrust face;

the pressurized oil generates an oil film between the first and second thrust faces;

the second thrust face is configured to rotate relative to the first thrust face and transmit the thrust forces to the bearing housing; and at least one of the thrust plate and the thrust washer includes a circumferential groove configured to trap debris borne by the pressurized oil and minimize an amount of the debris present in the oil film.

12. The engine of claim 11, wherein the thrust plate is defined by an outer first diameter and the thrust washer is defined by an outer second diameter, wherein the outer first diameter is greater than the outer second diameter, wherein the first thrust face includes at least one thrust pad and the second thrust face includes at least one thrust surface, wherein the thrust pad and the thrust surface are each defined by an inner third diameter and by an outer fourth diameter that is smaller than the outer second diameter, and wherein the circumferential groove is arranged on a fifth diameter that is smaller than the outer second diameter.

13. The engine of claim 12, wherein the fifth diameter is greater than each of the inner third diameter and the outer fourth diameter.

14. The engine of claim 12, wherein the thrust plate includes the circumferential groove.

15. The engine of claim 14, wherein the thrust pad includes a plurality of individual thrust pads separated by respective radial slots, and the radial slots are in fluid communication with the circumferential groove.

16. The engine of claim 15, wherein the thrust plate defines a feed-hole at one of the radial slots, and wherein the pressurized oil enters the thrust bearing assembly via the feed-hole.

17. The engine of claim 15, wherein each of the plurality of individual thrust pads has a length, and wherein the length of one of the plurality of individual thrust pads is shorter than the length of each of the rest of the plurality of individual thrust pads, such that the debris is directed to the circumferential groove via the radial slots and away from the rest of the plurality of individual thrust pads.

18. The engine of claim 12, wherein the thrust washer includes the circumferential groove.

19. The engine of claim 17, wherein the thrust washer is configured to rotate with the shaft about an axis and the circumferential groove is centered on the axis.

20. The engine of claim 11, further comprising a turbocharger oil line, wherein the engine block additionally defines an engine oil passage in fluid communication with the oil pump, wherein the turbocharger oil line is in fluid communication with the engine oil passage to thereby supply the pressurized oil from the oil pump to the thrust bearing assembly, and wherein the turbocharger oil line is characterized by an absence of an in-line oil filter configured to trap the debris borne by the pressurized oil.

* * * * *